United States Patent

Prachar

[15] 3,703,102
[45] Nov. 21, 1972

[54] MULTIDIRECTIONAL SENSOR

[72] Inventor: Otakar P. Prachar, Santa Barbara, Calif.

[73] Assignee: General Motors Corporation, Detroit, Mich.

[22] Filed: Sept. 8, 1970

[21] Appl. No.: 70,319

[52] U.S. Cl. ..............................73/514, 200/61.45 R
[51] Int. Cl. ............................................G01p 15/02
[58] Field of Search ........73/492, 514, 515; 116/114; 200/61.45, 61.53

[56] References Cited

UNITED STATES PATENTS

| | | | |
|---|---|---|---|
| 3,263,504 | 8/1966 | Parkinson et al. | 73/515 |
| 3,081,640 | 3/1963 | Chatillon | 74/110 |
| 2,671,832 | 3/1954 | Hansard et al. | 200/61.53 |
| 3,227,834 | 1/1966 | Keese | 73/514 |
| 3,267,739 | 8/1966 | Epps et al. | 200/61.53 |
| 2,766,345 | 10/1956 | Crites | 200/61.45 |
| 3,407,667 | 10/1968 | Doeringfeld | 200/61.45 |
| 3,488,462 | 1/1970 | Gignotto | 200/61.45 |

*Primary Examiner*—James J. Gill
*Assistant Examiner*—Herbert Goldstein
*Attorney*—W. E. Finken and Herbert Furman

[57] ABSTRACT

A cylindrical seismic mass includes three equally circumferentially spaced conical depressions in its lower end wall which receive and seat a first set of balls seating in like mating depressions in a plate supported on the lower wall of a cylindrical housing. The upper end wall of the mass contains three equally circumferentially spaced conical depressions which seat a second set of balls also seating in an overlying first plate having like depressions mating with those of the mass. An overcenter disc spring supports the plate in engaged position with the second set of balls to in turn hold the mass in engagement with the first set of balls and locate the mass against movement laterally of the lower wall of the housing. An operator plate is supported adjacent the first plate by a disc spring in spaced relationship to a primer. When the mass receives an acceleration pulse of predetermined amplitude and time, it shifts generally parallel to the lower wall of the housing and the camming action of the first set of balls moves the mass axially or raises the mass. This movement of the mass and the camming action of the second set of balls axially shifts the first plate so that the disc spring thereof moves overcenter. The first plate then engages the operator plate to shift the operator plate axially so that the operator disc spring moves overcenter and the operator plate engages the primer. A modification includes a second plate supported by an overcenter disc spring between the first plate and operator plate.

3 Claims, 3 Drawing Figures

INVENTOR.
Otakar P. Prachar
BY Herbert Furman
ATTORNEY

MULTIDIRECTIONAL SENSOR

This invention relates to multidirectional sensors and more particularly to an omnidirectional sensor having an operator movable from normal to actuated position by a mechanical amplifying means actuated by a seismic mass.

One feature of this invention is that the operator is movable between normal and actuated positions along a predetermined axis and the mechanical amplifying means is energized by the seismic mass when the mass is subjected to an acceleration pulse of predetermined amplitude and time so as to move laterally of the direction of movement of the operator. Another feature of this invention is that the mass shifts in the same direction of movement as the operator upon movement thereof laterally of this direction so as to energize the mechanical amplifying means and move the operator to actuate position. A further feature of this invention is that multiple stage mechanical amplifying means are interposed between the operator and the seismic mass.

Yet another feature of this invention is that the seismic mass is normally located against movement laterally of the direction of movement of the operator as well as being shifted in this same direction upon movement of the mass by means of mating like depressions in the mass and in a support for the mass which receive balls. Yet a further feature of this invention is that the mechanical amplifying means includes an overcenter type disc spring supporting the operator and an intermediate member supported by an overcenter type disc spring and operatively connected to the mass, the latter spring seating the balls within the mass depressions and in the like depressions in the support. Still another feature of this invention is that the member is operatively connected to the mass by balls seating in mating like depressions in the member and mass.

These and other features of the sensor of this invention will be readily apparent from the following specification and drawings wherein.

Figure 1:
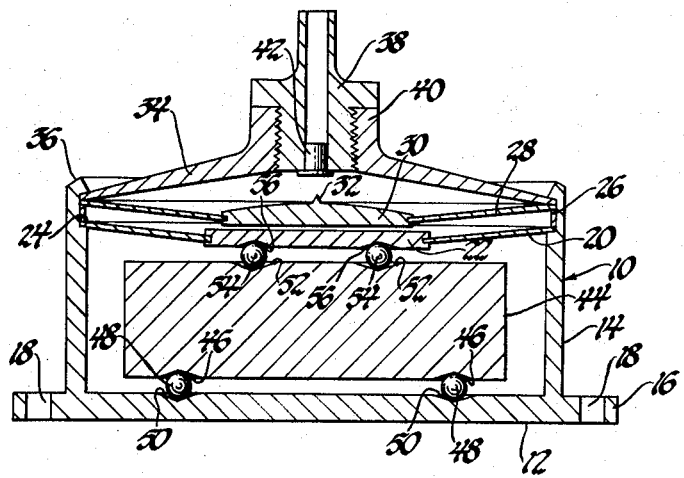
FIG. 1 is a view of a sensor according to one embodiment of this invention, with the sensor being shown in normal or unactuated position.
Figure 2:
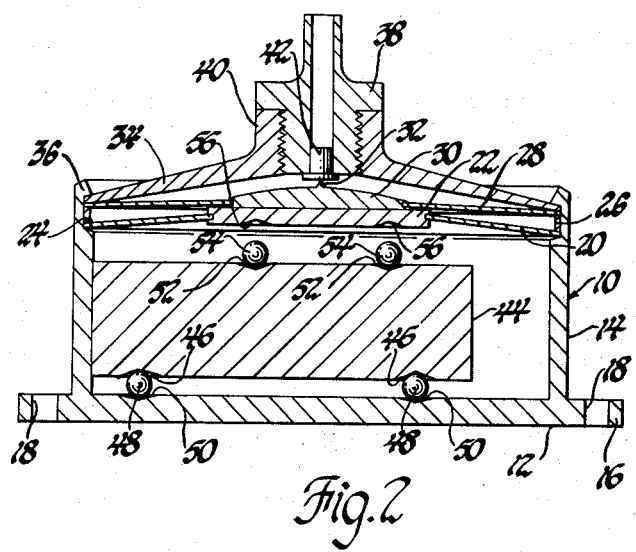
FIG. 2 is a view similar to FIG. 1 showing the sensor in actuated position.

Referring now to FIGS. 1 and 2 of the drawings, a sensor 10 according to one embodiment of this invention includes a circular base plate 12 having a cylindrical wall 14 extending normal thereto. Plate 12 includes a flange 16 which may be apertured at any one or more places 18 to provide for mounting of the sensor on any suitable support such as a vehicle body.

A generally frusto-conically shaped disc spring 20 has its inner peripheral edge received within a groove in the peripheral wall of a circular plate 22. The outer peripheral edge of spring 20 seats on a radially tapered axially facing shoulder 24 of wall 10. A cylindrical spacer 26 seats on the outer edge portion of disc spring 20, and the outer peripheral edge of a second disc spring 28 seats on the spacer 26. The inner peripheral edge of spring 28 is received within a groove in the peripheral wall of a cylindrical operator 30 which includes a central firing pin 32. A generally frusto-conically shaped cover member 34 has its outer peripheral edge seating on the outer peripheral edge portion of spring 28. The upper edge portion 36 of wall 14 is flanged or staked over the cover plate to thereby retain the cover plate 34, the disc springs 20 and 28 and spacer 26 in place against any bodily movement relative to wall 14 as shown in FIG. 1. An externally threaded bushing 38 is received within an internally threaded central boss 40 of plate 34 and supports a percussion primer or detonator 42.

The lower end wall of a generally cylindrical seismic mass 44 includes three equally circumferentially spaced conical depressions 46. Each depression seats a ball 48 which in turn seats within like shaped and spaced depressions 50 in the base plate 12. The upper end wall of the mass 44 likewise includes three equally circumferentially spaced depressions 52 each of which seats a respective ball 54. The balls 54 also seat within like shaped mating depressions 56 in the lower wall of the plate 22. The normal free position of spring 20 is at a slightly lesser conical angle than shown in FIG. 1 so that spring 20 is slightly overcenter. This causes plate 22 to seat the balls 54 in engagement with the mating pairs of respective depressions 52 and 56 and in turn seat balls 48 in engagement with their mating pairs of depressions 46 and 50. Thus, the mass 44 is normally held against movement axially or radially of wall 14 unless an acceleration pulse of predetermined amplitude and time is received.

When such a pulse is received, the mass 44 will shift laterally or radially of wall 14 from its FIG. 1 position to its FIG. 2 position. As the mass shifts radially of the wall 14, it will also shift axially of the operator 30 or generally normal to the wall 12 due to the camming action of the balls 48 or movement of these balls outwardly of their respective depressions 50. Likewise balls 54 will move radially outwardly of depressions 52 to cam plate 22 axially of the mass. The axial movement of the mass and the action of balls 54 will move plate 22 through a sufficient axial distance so that spring 20 will move overcenter from its FIG. 1 position to its FIG. 2 position. Plate 22 will then engage the operator 30 and move the operator axially until its disc spring 28 moves overcenter and the operator then moves to its actuated position in engagement with the detonator 42 as shown in FIG. 2 to fire the detonator.

The spring 20 thus functions as both a threshold spring for the mass 44 and a mechanical amplifying spring for the plate 22, while spring 28 functions only as a mechanical amplifying spring.

Figure 3:
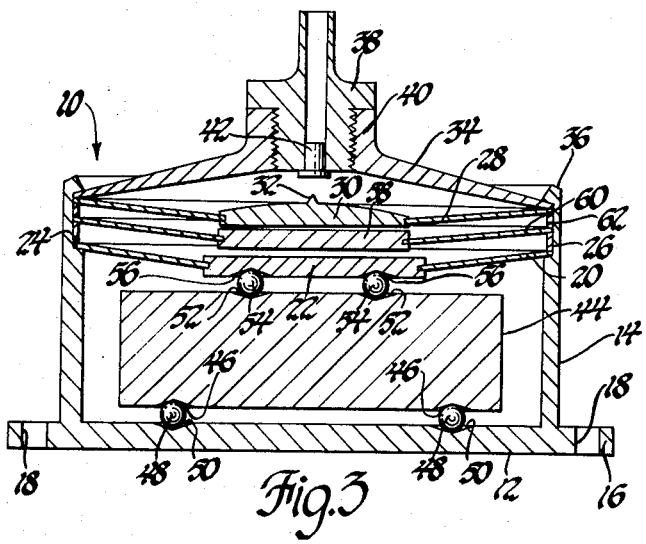
FIG. 3 is a view similar to FIG. 1 showing another embodiment of the invention.

FIG. 3 shows a modification which includes an additional plate 58 interposed between the operator 30 and the plate 22 and supported by a respective disc spring 60 which seats on the spacer 26. An additional spacer 62 is interposed between the outer peripheral edge portion of the disc spring 60 and the spring 28 of operator 38. This modification thus includes additional mechanical amplifying means. It is believed that operation of this modification is apparent without any further description.

The sensor 10 of this invention is particularly intended for use with an air cushion restraint system for a vehicle body. Generally such a system can include a diaphragm sealed pressure vessel which communicates with an inflatable cushion in the event of vehicle impact to inflate the cushion. The primer or detonator 42 may either directly or indirectly rupture the diaphragm of such a pressure vessel when the vehicle impact subjects the mass 44 to an acceleration pulse of required values to thereby inflate the cushion.

Thus, this invention provides an improved omnidirectional sensor.

I claim:

1. A multidirectional sensor comprising, in combination, a planar support having a plurality of spaced depressions therein opening laterally of the support, an operator, mechanical amplifying means mounting the operator on the support for linear movement laterally of the support between normal and actuated positions, the amplifying means including an actuating planar member having a plurality of spaced depressions therein opening to the support, a seismic mass having a plurality of first depressions, each opening to and paired with one of the support depressions, and a plurality of second depressions, each opening to and paired with one of the planar member depressions, a ball received in each pair of depressions to locate the seismic mass between the support and the actuating member of the mechanical amplifying means and normally hold the seismic mass against movement, an acceleration pulse of predetermined amplitude and time applied to the seismic mass moving the seismic mass relative to the support, the balls in the pairs of depressions between the mass and the support camming the mass laterally of the support as the mass moves relative thereto, the balls in the pairs of depressions between the mass and the actuating member camming the actuating member relative to the mass as the mass is being cammed normal to the support to thereby actuate the mechanical amplifying means to move the operator laterally of the support from its normal position to its actuated position.

2. A multidirectional sensor comprising, in combination, a support having a plurality of generally conical depressions therein, a linearly movable operator, first mechanical amplifying means mounting the operator on the support for linear movement between normal and actuated positions, a seismic mass having a plurality of generally conical depressions in one side thereof opening to the support depressions and paired therewith, a member located intermediate an opposite side of the seismic mass and the operator and including a plurality of generally conical depressions opening to like depressions in said opposite side of the seismic mass and paired therewith, a ball received in each pair of depressions to mount the seismic mass between the member and the support, second mechanical amplifying means mounting the member and acting to hold the balls in the conical depressions to hold the seismic mass stationary relative to the support, the seismic mass being moved laterally of the direction of movement of the operator when subjected to an acceleration pulse of predetermined amplitude and time, said lateral movement of the seismic mass causing movement of the seismic mass and the member normally of the support by camming action of the balls in the conical depressions to activate the first and second mechanical amplifying means and move the operator linearly to actuated position.

3. A multidirectional sensor comprising, in combination, a support having a plurality of generally conical depressions therein, a linearly movable operator, first overcenter type disc spring means mounting the operator on the support for linear movement between normal and actuated positions, a seismic mass having a plurality of generally conical depressions in one side thereof opening to the support depressions and paired therewith, a planar member located intermediate the other end of the seismic mass and the operator and including a plurality of generally conical depressions opening to like depressions in the other end of the seismic mass and paired therewith, a ball received in each pair of depressions to mount the seismic mass between the planar member and the support, second overcenter type disc spring means mounting the member in spaced relation from the operator and acting to hold the balls in the conical depressions to hold the seismic mass stationary relative to support, the seismic mass being moved laterally of the direction of movement of the operator when subjected to an acceleration pulse of predetermined amplitude and time, the balls in the depressions camming the seismic mass normally relative the support and the planar member normally of the seismic mass and into engagement of the operator and causing the first and second overcenter type disc spring means to move overcenter and thereby the operator to actuated position.

* * * * *